Dec. 26, 1922.

P. RING.
MOTOR VEHICLE HEADLIGHT.
FILED DEC. 6, 1920.

INVENTOR,
Paul Ring,
BY
Frank Fuller
ATTORNEY.

Dec. 26, 1922.
P. RING
MOTOR VEHICLE HEADLIGHT.
FILED DEC. 6, 1920.
1,439,712
2 SHEETS-SHEET 2
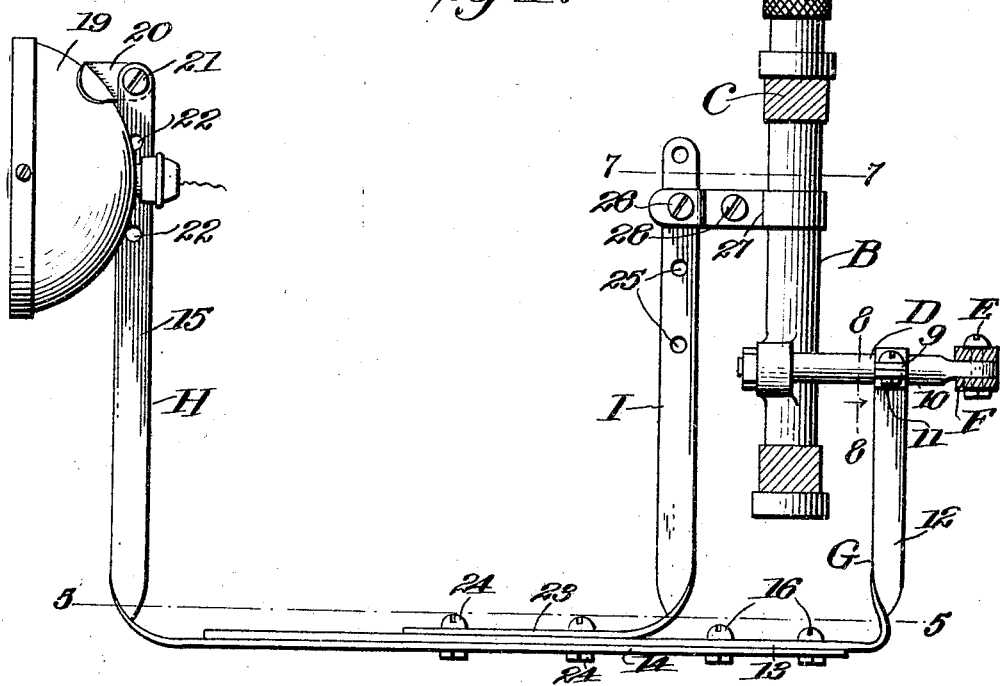
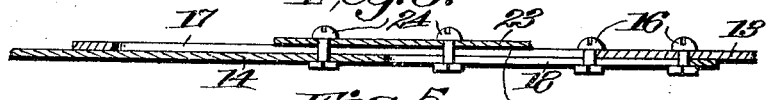
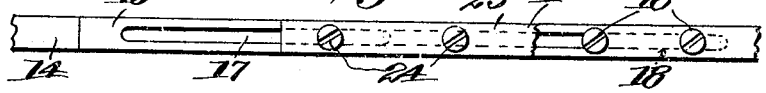
INVENTOR,
Paul Ring
BY
Frank Fuller
ATTORNEY Patented Dec. 26, 1922.

1,439,712

UNITED STATES PATENT OFFICE.

PAUL RING, OF DETROIT, MICHIGAN.

MOTOR-VEHICLE HEADLIGHT.

Application filed December 6, 1920. Serial No. 428,660.

*To all whom it may concern:*

Be it known that PAUL RING, a citizen of the United States, residing at Detroit, in the county of Wayne and State of Michigan, has invented certain new and useful Improvements in Motor-Vehicle Headlights, of which the following is a specification.

My invention relates to an automobile or another vehicle headlight. The main object is to provide a novel and improved construction in which the headlight or headlights will turn or move correspondingly to and with the front wheels of the vehicle so that even on short turns of the wheels, the path will be well illuminated.

Another object is to provide a construction in which the parts are relatively adjustable to accommodate attachment to various makes and sizes of automobiles or other vehicles without necessitating alteration in their construction.

I also aim to provide a construction having attaching brackets for fastening to both the wheel spindle and the crank leading therefrom in order that the apparatus may be rigidly secured and braced in use.

Additional objects and advantages will appear hereinafter from the description following taken in connection with the accompanying drawings of one preferred embodiment.

In said drawings,

Fig. 4 is a sectional view taken on line 4—4 of Fig. 3 but with the wheel removed.

Figure 1:
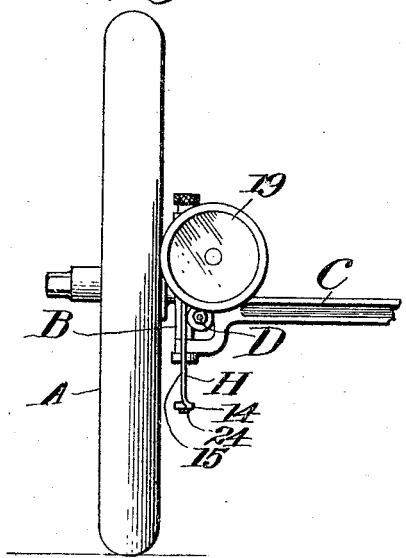
Fig. 1 is a front elevation showing a headlight associated with automobile parts according to my invention.
Figure 2:
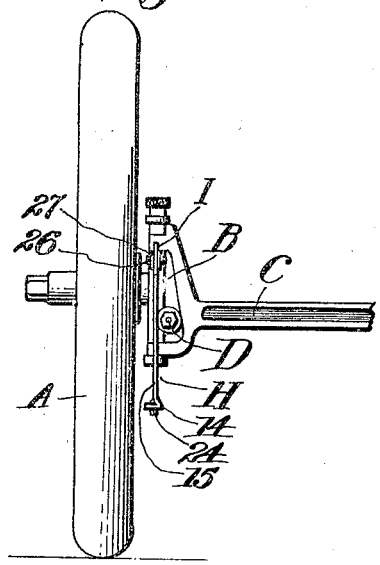
Fig. 2 is a view similar to Fig. 1 but with the headlight removed.
Figure 3:
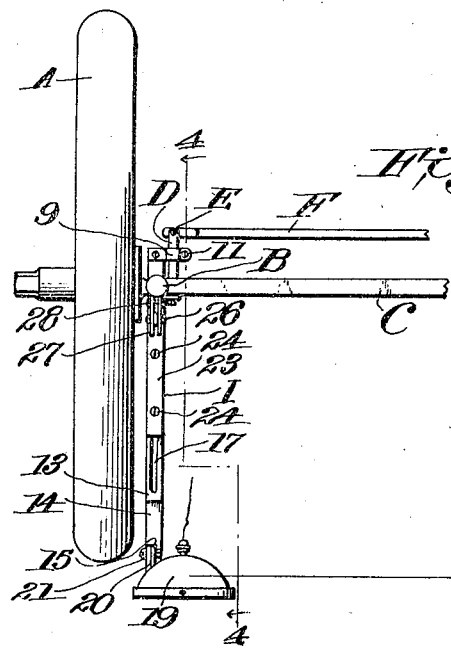
Fig. 3 is a plan view of the parts of Fig. 1.

Fig. 5 is a view taken on the line 5—5 of Fig. 4. Fig. 6 is a longitudinal central section through the parts of Fig. 5, and Figs. 7 and 8 respectively are sections taken on lines 7—7 and 8—8 of Fig. 4.

Referring specifically to the drawings wherein like reference characters designate like or corresponding parts, parts of an automobile have been illustrated to afford an understanding of the invention and thus are to be taken as conventional only, for instance wheel A with its spindle B pivoted for lateral movement in axle C with a crank D extending rearwardly from the spindle and being pivoted at E to steering rod F.

Coming now to my improvements, a main bracket is provided consisting essentially of sections G and H. Section G has a horizontal arm 9 cooperating with a bar 10, through which bar and arm bolts 11 are passed to clamp the bracket to crank D. A vertical distance arm 12 depends from arm 9 to a horizontal arm bar 13. A horizontal arm or bar 14 of section H cooperates with bar 13. Section H is completed by an arm 15 which rises from bar 14.

Arms or bars 13 and 14 are adjustably or extensibly connected by means of bolts 16 and elongated slots 17 and 18 in bars 13 and 14 respectively.

Arm 15 supports the headlight or lamp which is designated 19. This lamp is preferably of the electric type and illuminated from the battery of the ignition system of the automobile but it may be of any type, for instance oil-burning. A lug 20 is provided on the lamp and a bolt 21 passes therethrough and through either hole of a series of holes 22 desired according to height at which the lamp is to be disposed.

A supporting bracket I is employed having a tang or horizontal arm 23 which is fastened in place by bolts 24 which extend through elongated slot 18 and then through bar 13. This bracket also has a vertical arm provided with holes 25 through either of which a bolt 26 may extend which also passes through the ends of a clamp 27 surrounding the spindle B. A bolt 28 may also pass through said ends.

It will be understood that the improvements may be essentially made from strap iron or steel and bolts and due to the adjustable features set forth be attachable to various makes and models of automobiles.

In use as the driver of the auto turns the steering wheel, rod F is correspondingly moved which in turn moves the crank D, spindle B and the wheel.

As the various brackets are fastened rigidly to the crank and spindle they move as an integer. Accordingly the light is thrown directly into the path to be traversed.

Various changes in the details of construction may be resorted to within the spirit and scope of the invention as defined by appended claim.

I claim:—

In combination with vehicle steering mechanism, of the wheel spindle and crank thereon, a bracket, means to clamp the bracket to the crank, a lamp supporting bracket, one of the brackets having an elongated slot, a fastening means extending from the other bracket and through said slot, a clamp surrounding the spindle, a brace adjustably secured to the clamp, and said fastening means securing said brace to the brackets, as and for the purposes set forth.

In testimony whereof I affix my signature.

PAUL RING.